Dec. 19, 1961    C. R. HANNA    3,013,810
SPRUNG MASS MOVEMENT SENSING MEANS FOR VEHICLE STABILIZER
Original Filed Dec. 27, 1956    3 Sheets-Sheet 1

WITNESSES
John E. Healy Jr
James F. Young

INVENTOR
Clinton R. Hanna
BY
Carl E. Friedemann
ATTORNEY

United States Patent Office 3,013,810
Patented Dec. 19, 1961

3,013,810
SPRUNG MASS MOVEMENT SENSING MEANS
FOR VEHICLE STABILIZER
Clinton R. Hanna, Pittsburgh, Pa., assignor to Westinghouse Electric Corporation, East Pittsburgh, Pa., a corporation of Pennsylvania
Original application Dec. 27, 1956, Ser. No. 630,835, now Patent No. 2,976,052, dated Mar. 21, 1961. Divided and this application May 23, 1960, Ser. No. 30,796
9 Claims. (Cl. 280—124)

This invention relates to sensing means for a vehicle stabilizer, and more particularly for a power shock absorber device of a stabilized vehicle. The sensing means is, however, not limited to use with a power shock absorber but has universal application wherever sensing means as hereinafter disclosed and claimed may be applied.

This case is a division of the inventor's copending patent application Serial No. 630,835, filed December 27, 1956, now Patent No. 2,976,052, dated March 21, 1961, and entitled Vehicle Stabilizer Tilter and Leveling Means.

In present day conventional land vehicles, shock absorbing devices located between the sprung mass or body of the vehicle and the unsprung mass (usually comprising vehicle wheels and axles) are of the passive type. This type of shock absorbing device provides nearly adequate vehicle sprung mass oscillation attenuation when the frequency of the unsprung mass oscillatory movement is above the natural resonant frequency of the sprung mass. However, when the frequency of the unsprung mass oscillatory movement is approximately the same as the natural resonant frequency of the sprung mass, the passive shock absorber provides an inadequate means of preventing large sprung mass movements.

It is also common, with the use of passive shock absorbers, for present day vehicles to vary in longitudinal level upon a change in load and to respond to lateral accelerations during a vehicle turn in a manner causing the sprung mass of the vehicle to lean outwardly from the center of the turn. Since the sprung mass is usually located above its roll axis, it can be seen that movement of the sprung mass away from the center of the turn tends to cause the center of gravity of the sprung mass to act in a direction to cause overturning of the vehicle.

For power shock absorber devices it is of utmost importance that movements of the sprung mass with respect to space be properly and adequately sensed.

It is a broad object of this invention to provide a moving body sensing means that will provide a signal as a function of the movement of the body.

It is a more specific object of this invention to provide sensing means, mounted on a body the movements of which are to be sensed, that will sense movements of the body in any direction in a horizontal plane, movements in a vertical direction, and angular movement of the body with reference to a roll axis of the body.

Other objects, purposes and characteristic features of this invention will become obvious as the description of this invention progresses.

In each of the several views similar parts are designated by similar reference characters.

The sensing element as actually applied is used with a power shock absorber where one sensing unit is mounted in relation to each of the four wheels of the vehicle or at least two wheels, as the rear wheels. The actual disposition of the sensing element on the vehicle is not shown but will become more apparent from the following description.

Further, a better understanding of the sensing element, or means, can be had if the description is made with at least one shock absorber.

Figure 3:
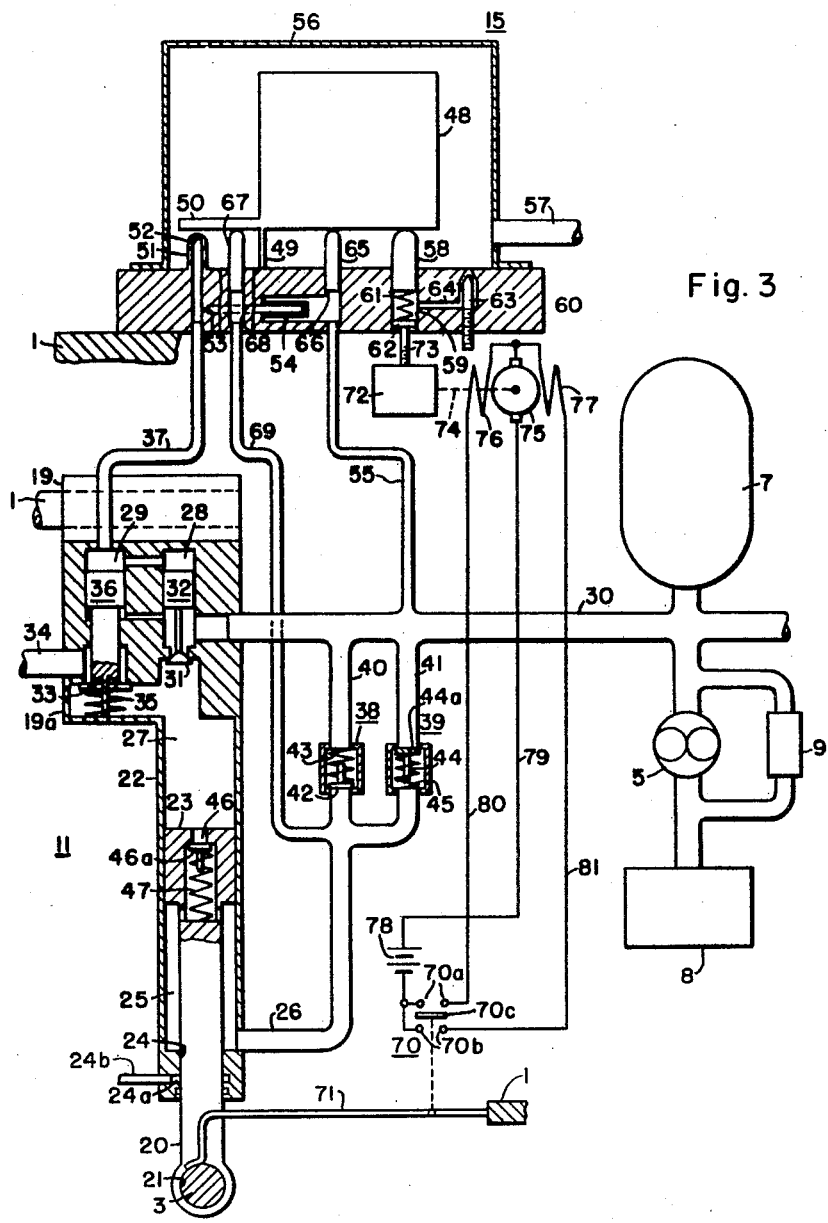
FIG. 3 is a diagrammatic showing of the sensing element, and includes, to show its environment of use, a diagrammatic showing of a power shock absorber and its associated power source.

If we assume that the typical shock absorber, shown in FIG. 3, is the shock absorber designated generally as 11 positioned on the left of the vehicle as viewed from the rear, it can be seen that the structure has a sprung mass 1 secured by a bushing 19 to an upper portion 19a housing control valves and a lower portion or piston rod 20 which is secured to the unsprung mass 3 by a bushing 21. The upper portion 19a, secured to the sprung mass 1, is provided with an integral cylinder 22 extending downwardly for receiving a piston 23 which is integral with the lower portion or piston rod 20. The cross-sectional area of piston rod 20 is equal to one half of the downwardly faced area of the piston 23 and is provided with a fluid sealing slip bushing 24 secured to the cylinder 22 of the upper portion 19. The bushing 24 is provided with a fluid annular ring leakage return passage 24a and a fluid return pipe 24b for preventing fluid leakage from the high pressure area within the cylinder 22 to the low pressure of the outside area. It also serves to reduce the friction of bushing 24 which would be quite high if subjected to the average cylinder 22 pressure. The piston 23 and the end sealing bushing 24 in cooperation with the cylinder 22 form a chamber 25 provided with fluid under pressure from the associated accumulator 7 delivered through the pipe 26 in a manner to be described hereinafter. A second chamber 27 is formed by the cylinder 22 and the end of the piston 23 opposite to the piston rod 20. The chamber 27 is in communication with a pair of fluid control valves 28 and 29 so that fluid may be admitted to or relieved from the chamber 27 in a manner demanded by the sensing element 15 and the movement of the piston 23 to be described hereinafter.

The valve 28 is a pressure fluid admission valve capable of delivering fluid from the accumulator 7 through the supply pipe 30, past the valve closure end 31 into the chamber 27. The valve 28 is provided with a piston 32, subjected on one side to the accumulator pressure and on the other side to a balancing force pressure determined by the sensing element, as explained hereinafter.

The valve 29 is an exhaust valve capable of allowing fluid to flow from the chamber 27, out past its valve seat 33 and into the fluid return pipe 34. The valve seat 33 of the exhaust valve 29 is a spring biased seat which is normally stationary but operable under emergency conditions of power failure to prevent a completely inoperative shock absorber, as explained hereinafter. It is sufficient to note at this time that upon a pressure drop in the chamber 27 during fluid supply failure, the valve seat 33 is drawn downwardly causing an associated coil bias spring 35 to be compressed. This allows fluid to flow from the return pipe 34, past the valve seat 33 and into the chamber 27. The exhaust valve 29 is provided with an actuating piston 36 which is subjected to accumulator pressure on the valve side of the piston and to a lower sensing element adjusted pressure on the side of the piston opposite the valve seat 33.

Accumulator pressure acting against the fluid control end 31 and the valve end side of the piston 32 results in a force in a direction to seat the valve end. This force is opposed by the sensing element 15 varied fluid pressure received through a pipe 37 to act on the larger area of the opposite side of the piston 32. Under normal conditions, with no accelerations being detected by the sensing element or device 15, the forces on the piston 32 of the intake valve 28 are approximately equal with the valve 31 being seated by the pressure applied by the fluid in chamber 27. Likewise, the pressures supplied to the piston 36 by the accumulator and the sensing feed pipe 37 as well as the chamber 27 applied pressure on the valve, all result in approximately no control or moving forces with the exhaust valve holding in its seated position.

The above described relationship of pressure to piston areas of the valves 28 and 29 is established so that the response of the valves is as near to a linear response as possible. With the valve forces so equalized, movement of the shock absorber piston 23 can command immediate fluid movement into or out of the chamber 27 with the sensing and control device then applying, pressure valve 28 and exhaust valve 29, control in response to sprung mass movement.

Located within the pressure feed from the accumulator 7 to the lower chamber 25 of the power shock absorber 11 is a pair of damper valves 38 and 39. The damper valves 38 and 39 are positioned in fluid pipes 40 and 41, respectively, interconnecting the main fluid supply pipe 30 with the lower chamber 25 through the feeder pipe 26. The damper valve 38 is a spring controlled valve capable of allowing flow from the chamber 25 to the accumulator 7 only. This valve comprises a movable member 42 held to its seated position by a spring 43 with zero force for that position.

The damper valve 39 is a similar valve positioned to allow flow from the accumulator 7 to the lower chamber 25 only. This valve involves a movable member 44 provided with a spring 45 for seating the valve in the position shown. Under the conditions of inactivity shown in FIG. 3, the pressure within the chamber 25 is equal to the accumulator 7 pressure.

The movable member 44 is provided with an orifice 44a passing therethrough for causing the action of the damper valve 39, as well as the damper valve 38, to follow a more nearly straight line of response. The orifice 44a is needed since without the orifice the rate of fluid transfer past the damper valves is slow at the beginning of a difference in pressure and increases as the pressure rises. The action of the orifice 44a to a difference in pressure is the opposite, with a rapid flow rate of change at the beginning and a reduced rate of change as the pressure rises. The two actions combined thus result in a more nearly straight line response curve.

One effect of the provision of damper valves 38 and 39 is to cause the pressure in passage 26 and chamber 25 to have substantial difference from the main supply pressure in passage 30 during movement of the piston 23. The pressure changes in passage 26 vary with the velocity of the piston movement and are used to give velocity control through a feedback arrangement hereinafter described. The other effect of the damper valves is to give damping of the movements of the vehicle masses.

The piston 23 within the cylinder 22 is provided with a normally closed emergency flow valve 46 having a movable member 46a biased to its closed position by a bias spring 47. The valve 46 is used to interconnect the chamber 25 with the chamber 27 under conditions of power source failure, as will be explained hereinafter.

The power shock absorber is controlled by a sensing and control device 15, which, as explained hereinbefore, is securely fastened to the frame or the sprung mass 1 of the vehicle. The sensing and control device 15 comprises a weight 48 supported for pivotal movement on a pair of leaf springs 49, disposed in spaced relation in the same plane adjacent one corner of the weight 48.

The pivot axis may be considered the line of intersection of a pair of reference planes perpendicular to each other, with the center of gravity of the mass 48 being disposed selected distances from the reference planes. In other words, the center of gravity of the mass 48 may fall in any one of the four quadrants defined by the two intersecting reference planes. One of the reference planes will be considered a horizontal plane and the other a vertical plane. The words "vertical" and "horizontal," as herein used, are thus not to be considered in a limiting sense but merely to show a relationship of parts without the use of much circumlocution.

As herein used, the center of gravity of the mass 48 is considered to be in the first quadrant defined by the reference planes, or, in other words, disposed to the right of a vertical plane including the pivot axis and above a horizontal plane also including the pivot axis.

From the foregoing it is apparent that any movement of the base, upon which the mass is pivotally mounted, in any direction cross-wise of the pivotal axis, except the rare direction of motion of the base in a plane including both the pivot axis and the center of gravity, will cause movement of the mass 48 about its pivot axis.

Projecting outwardly from the mass 48, adjacent to and on the opposite side of the support springs 49, is a pilot valve control arm 50. Positioned adjacent to and slightly spaced from the pilot valve control arm 50 is a pilot valve thimble 51, having an orifice 52 in the end thereof. The pilot valve thimble 51 is connected to the accumulator 7 through an orifice 53, filter 54 and the pressure pipes 55 and 30. The pilot valve thimble is also connected to the intake and exhaust valves 28 and 29 of the power shock absorber 11 through the previously mentioned pilot valve control pipe 37. It can be seen, therefore, that the accumulator fluid, under pressure, is fed through the pipe 30, the pipe 55, the filter 54 and orifice 53 filling the pilot valve control fluid pipe 37 and flowing through the orifice 52 in the pilot valve thimble 51. The fluid flow out of the orifice 52 fills the chamber about the sensing weight 48 within the cover 56 and returns to the reservoir 8 through a return pipe 57. It can be seen that controlled fluid flow occurs through the orifice 52 with the amount of flow being determined by the proximity of the pilot valve control arm 50 to the orifice 52. This flow variation through the orifice 52 in turn causes a pressure variation on the control pistons of the power shock absorber intake and exhaust valves 28 and 29, respectively.

Since the pivot point of the weight 48 is to one side of the center of gravity, it is necessary to provide a static balance for the weight 48. This static balance is provided through a piston 58 positioned within an opening 59 in the base 60 of the sensing and control device 15. The piston 58 is biased upwardly against the bottom of the weight 48 by a bias spring 61 provided with a variable support 62 for varying the amount of bias presented to the sensing and control weight 48. In addition, the piston 58 is provided with fluid damping through a needle valve 63 having an orifice and pipe 64 interconnecting the area within the sensing weight 48 cover or shell 56 with the area below the piston 58, housing the bias spring 61. In this way, fluid enters past the needle valve 63 through the passage 64, and is restricted in its movement into and out of the area below the piston 58 by the size of the orifice which is adjusted by the needle valve 63. The action of this fluid damping is necessary to eliminate resonant vibrations of the control mass.

Since variations in the accumulator pressure supplied by the pump 5 would inherently affect the balance of the weight 48, a pressure compensating piston 65 is positioned in contact with the bottom of the sensing weight 48. The compensating piston 65 is positioned within a bore 66 connected with the filter chamber 54 and fluid supply pipe 55. It can be seen then that variations in the accumulator pressure will then be reflected in the force of piston 65 on the sensing weight 48 to compensate the average forces of the orifice 52 and piston 67 on the opposite side of the pivot 49. Thus the weight 48 assumes the same average position for varying accumulator pressures.

In order to introduce velocity control to the sensing weight 48 in addition to the acceleration control previously described, a feedback piston 67 is provided. The piston 67 cooperates with the pilot valve control arm 50 at a point to the left of the pivot springs 49, as viewed in FIG. 3. The feedback piston is housed within a bore 68 in the base 60 and is connected to the chamber 25 of the power shock absorber by a fluid control pipe 69. For this reason the response of the feedback piston 67 depends upon pressure variations which are proportional to the relative velocity of the movement of the piston 23 within the cylinder 22 reflected in relatively small pressure changes in the chamber 25 above or below the accumulator pressure during fluid flow through one of the damper valves 38 or 39.

Operation of the power shock absorber system of FIG. 3 as described up to this point, will now be explained. If we assume that the vehicle is passing over an uneven surface in which the unsprung mass 3 is driven upwardly toward the sprung mass of the frame 1, the action of this motion through the power shock absorber and the supporting springs 2 would then cause a vertical acceleration on the weight 48 of the sensing device 15. Since the motion of the frame or the sprung mass 1 is in an upward direction, the weight 48 resists the upward movement resulting in a lagging of the weight downwardly causing the pilot valve orifice 52 to be relieved, allowing greater fluid flow through the orifice. This is due to the weight 48 pivoting clockwise about the leaf springs 49, since the center of gravity of the weight is to the right of the pivot springs 49.

An increase in flow through the orifice 52 results in a reduction of pressure in the pilot control pipe 37 and on the pistons 32 and 36 of the intake and exhaust valves 28 and 29 of the power shock absorber. The resulting reduction in pressure above each of the pistons 32 and 36 then causes the accumulator pressure on the under side of the pistons 32 and 36 to result in a more firm seating of the intake valve 28 and an opening of the exhaust valve 29. When this occurs, a rapid reduction in pressure within the chamber 27 of the power shock absorber takes place, allowing the piston 23 to move rapidly upward in response to the uneven terrain. The pressure from the accumulator in chamber 25 causes the force on the under side of the piston 23 to exceed the force on the upper side with the result that upward accelerations of the sprung mass are greatly impeded. The rapid upward movement of the piston 23 reduces the pressure within the chamber 25 slightly, however, causing the damper valve 39 to open and supply more fluid to the chamber 25. The reduction in pressure within the chamber 25 also results in a reduction of the force imposed on the pilot valve control arm 50 by the feedback piston 67. This action tends to reduce the flow through the pilot valve orifice 52 with the result that damping of the resonances of the vehicle masses occurs.

Figure 5:
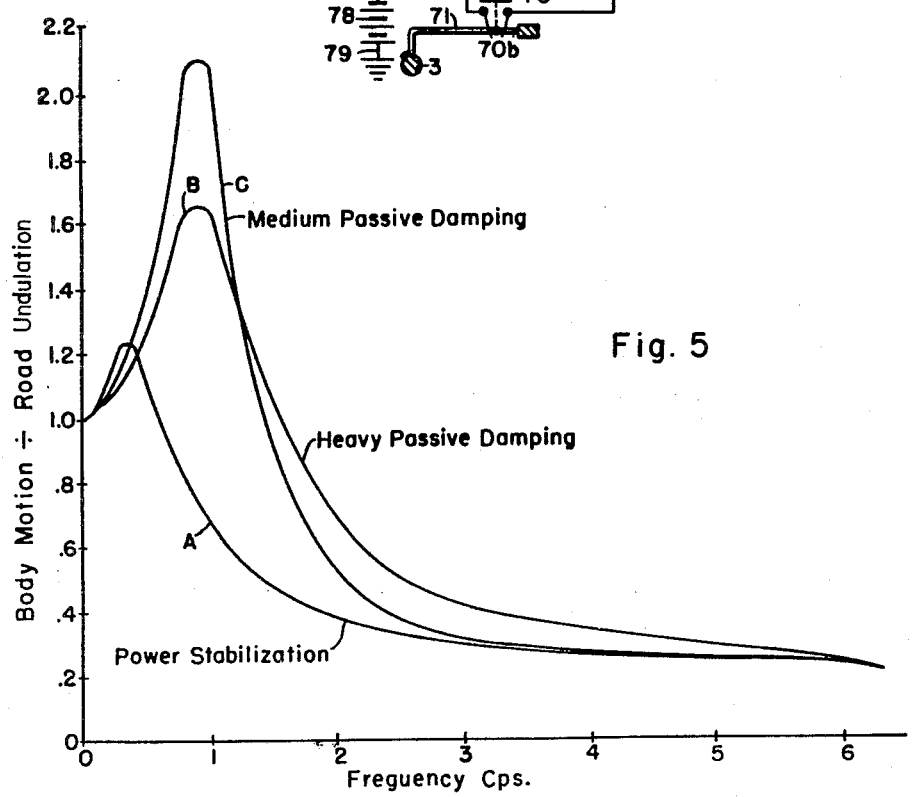
FIG. 5 shows some curves showing the relationship of body undulation divided by the road undulation to the frequency of the sprung mass movement.

The graph shown in FIG. 5 discloses a family of curves showing the response of the sprung mass of a vehicle with different types of shock absorbers applied thereto, and with the unsprung mass being moved at constant amplitude over a range of frequencies from less than one cycle per second to six cycles per second.

Curve A is a curve showing the sprung mass response with the power shock absorber of this invention applied thereto. As shown by this curve, the peak in undulations of the sprung mass relative to road undulations occurs at a point well below one cycle per second an is only 1.2 times the amplitude of the road undulation.

Curve B is a curve showing the sprung mass response using a conventional passive type shock absorber of heavy damping quality. The peak with this device occurs at approximately the one cycle per second period and is nearly 1.7 units in amplitude. In addition, the magnitude of the response of the sprung mass at higher frequencies is greater.

In order to reduce the magnitude of the high frequency response of the sprung mass while using passive type shock absorbers, the damping action of the shock absorber is reduced as shown by curve C. It is obvious, however, that in order to obtain good high frequency response with passive type shock absorbers a sacrifice in low frequency response occurs. As shown by curve C, the peak rise occurs at the one cycle per second frequency and is 2.1 units in amplitude.

From the results shown by the family of curves of FIG. 5, it is clear that control of pressures within the power shock absorber of this invention through the use of an acceleration sensing device provides greatly improved sprung mass response as compared to response under conventional passive shock absorber control devices.

Referring again to FIG. 3 under operation involving a separation of the sprung and unsprung masses due to the unsprung mass 3 following a depression in the surface being traversed, it can be seen that a pressure rise within the chamber 25 takes place. The increase in pressure within the chamber 25 as the piston 23 attempts to move downward along with the unsprung mass causes the sprung mass to attempt a following action. The acceleration of the sprung mass downwardly causes the weight 48 to pivot counterclockwise about its support springs 49, resulting in a restriction of the orifice 52 in the pilot thimble 51. This restriction causes a rise in pressure in the chambers above the pistons 32 and 36 of the intake and exhaust valves, respectively. The rise in pressure above each of the pistons 32 and 36 results in an opening of the intake valve 28 and a more firm seating of the exhaust valve 29. Opening of the intake valve 28 results in an increase in pressure within the chamber 27, aiding the piston 23 in its downward movement due to the separation of the sprung and unsprung masses. The resultant increase in pressure within the chamber 25 is then relieved through the damper valve 42 into the accumulator 7 system. This rise in pressure within the chamber 25 also results in a feedback pressure increase on the piston 67. The action of the piston 67 then results in a clockwise rotation tendency of the weight 48 with the end result being a velocity stabilization of the original or initial action of the weight 48.

It should be pointed out at this time that the pressure within the chamber 25 is approximately twice that of the pressure within the chamber 27 under periods of stabilization. The resultant forces on the piston 23 are equal and opposite since the affected area of the piston 23 in the high pressure zone of the chamber 25 is one half of the area of the piston 23 exposed to the chamber 27. For example, a typical accumulator pressure might be on the order of 2000 p.s.i. with the resulting pressure within the chamber 25 under static conditions also being 2000 p.s.i. The pressure within the chamber 27, however, would only be 1000 p.s.i. due to the action of the valves 28 and 29. This, theoretically, provides an active range for the control vales 28 and 29 of from zero to 2000 p.s.i. within the chamber 27. The pressures of the chamber 25 vary a smaller amount, however, this amount occurs about the 2000 p.s.i. level. It is this difference in pressure between the chamber 25 and the chamber 27 during operation of the pump supplying pressure to the power shock absorber that maintains the emergency flow valve 46 closed at all times.

It should also be pointed out that the intake and exhaust valves 28 and 29 are operated at a high pilot pressure level in order to have the action of these valves occur over the most nearly straight portion of the pressure response curve for the valves. This straight line portion of the curve occurs between maximum and minimum pilot valve orifice opening establishing pilot pressures of between 1000 p.s.i. and 2000 p.s.i. The piston area relationships of the valves 28 and 29 are thus selected to allow valve operation within this pressure zone.

Operation of the power shock absorber in response to lateral accelerations will now be explained. If we assume the vehicle is starting into a turn to the right, as viewed in FIG. 3, with the assumption that the power shock absorber is located on the left side of the vehicle as seen from the rear, such as the power shock absorber 11, the acceleration of the vehicle to the right causes the weight 48 to pivot counterclockwise about the leaf springs 49. This results in a restriction of the orifice 52 of the pilot valve thimble 51, resulting in a rise in pressure in the areas above the pistons 32 and 36 of the feed and exhaust valves 28 and 29, respectively. As explained hereinbefore, this results in an increase in pressure above the pistons 32 and 36 causing the intake valve 28 to open and the exhaust valve 29 to become more firmly seated. The opening of the valve 28 results in an increase in pressure within the chamber 27 and a movement of the piston 23 downwardly, separating the sprung and unsprung masses. Since this power shock absorber is indicated as being located on the left side of the vehicle as seen from the rear, it should be obvious that a tilting action of the vehicle sprung mass toward the center of the circle takes place.

With the sensing mass 48 having its center of gravity displaced both horizontally and vertically from the effective pivot axis of the mass provided by the spring 49, to give response to both vertical and lateral accelerations, and if the sensing mass is positioned above and to one side of the roll axis of the sprung mass 1; the sensing mass is positioned on the sprung mass relative to its roll axis so that the sensing mass response to vertical accelerations exceeds its response to lateral accelerations as the sprung mass is accelerated angularly about said roll axis and the net response is in the right direction to give tilting action of the sprung mass toward the center of the vehicle turning circle.

It is pointed out that with the present invention the acceleration response of the power stabilizer effectively increases the equivalent sprung mass of the vehicle severalfold. Any force, such as the vehicle spring force or damping force due to high velocity of the unsprung mass relative to the sprung mass, therefore causes much lower acceleration of the body than with conventional shock absorbers. Such lower accelerations are the same as would occur had the springs been softer and the relative damping lower. It can be shown that insofar as the unsprung mass movements are concerned, the damping is in actuality reduced.

The system of FIG. 3 also discloses a leveling control for the shock absorber 11. The purpose of the leveling control is to provide a readjustment of the relative distances between the sprung and unsprung masses when a change in load occurs within the sprung mass 1 including the vehicle body (not shown). The leveling structure shown in FIG. 3 comprises a leveling control switch 70 having two pairs of contacts 70a and 70b supported on the sprung mass of the vehicle. Associated with the two pairs of contacts 70a and 70b is a shunting bar 70c capable of selectively bridging each pair of contacts upon certain changes of load conditions within the vehicle. The bridging contact 70c is controlled by a resilient leaf spring 71 harving one end secured to the under-carriage or unsprung mass 3 and the other end secured to the sprung mass 1, as shown in FIG. 3. The leaf spring 71 provides a means of introducing a large motion ratio between the unsprung mass 3 movement and bridging contact 70c movement. The addition of a load within the vehicle causing the sprung mass 1 to settle causes the bridging contact 70c to bridge the pair of contacts 70a completing an electrical circuit, to be described hereinafter. If, however, a load is removed from the vehicle, causing the sprung mass 1 to rise, with respect to the unsprung mass, the bridging contact 70c is caused to bridge the pair of contacts 70b completing a second electrical circuit, to be described hereinafter.

Supported on the sprung mass 1, in a position to reposition the variable support 62 of the bias piston 58 in the sensing element 15, is a gear train 72 having a gear ratio input to output of several hundred to one. The output of the gear train 72 is delivered to the variable support 62 through a vertically moving shaft 73. The gear train 72 is provided with an input shaft 74 driven by a reversible motor 75. As shown in FIG. 3, the motor 75 is provided with a pair of windings 76 and 77 for causing the motor to rotate in one direction or the other.

The switch 70 has one of each of its pairs of contacts 70a and 70b connected in parallel and through a source of power 78, a conductor 79 to the armature of the motor 75. The other terminal of the pairs of contacts, indicated as 70a, is then connected through a conductor 80 to the winding 76, which has its other end connected to the armature of the motor 75. Likewise, the other contact of the pair of contacts 70b is connected through a conductor 81 to the winding 77, which is also connected to the armature of the motor 75.

It can be seen, therefore, that displacement of the sprung mass downwardly causes the bridging contact 70c to bridge the contacts 70a, energizing the motor 75, through its winding 76, causing a rotation of the shaft 74 and an extension of the output shaft 73 of the gear train 72. Extension of the shaft 73 in turn increases the bias pressure on the piston 58, which then causes the sensing weight 48 to pivot counterclockwise about its resilient leaf springs 49, restricting the output of the pilot orifice 52 and thus increasing the fluid flow and pressure within the chamber 27 of the power shock absorber 11, as explained hereinbefore. This action drives the piston 23 downwardly, causing separation movement of the sprung and unsprung masses until the contact 70c is again separated from the contacts 70a.

If a load is removed from the vehicle sprung mass, it can be seen that the contact 70c then bridges the contacts 70b, causing a reverse action to take place. It should be pointed out at this time that it is necessary for a time delay to be introduced between the action of the contact switch 70 and the resulting motion delivered by the power shock absorber 11. This time delay is desirably from one to two minutes in length, and it is introduced by the high ratio of the gear train 72.

Figure 1:
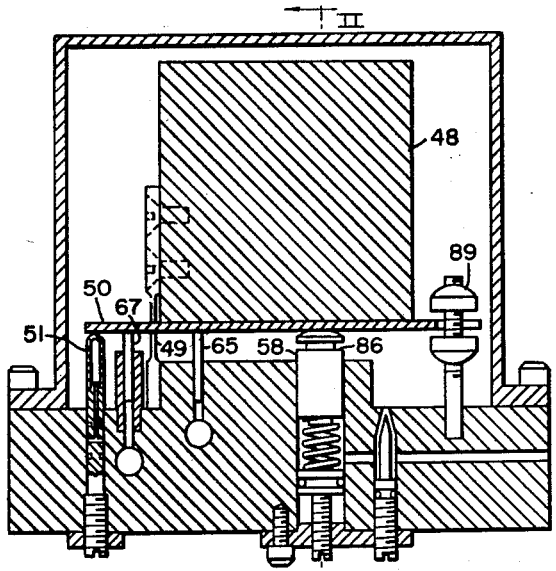
FIGURE 1 is a sectional view of a power shock absorbing sensing control device of this invention.
Figure 3A:
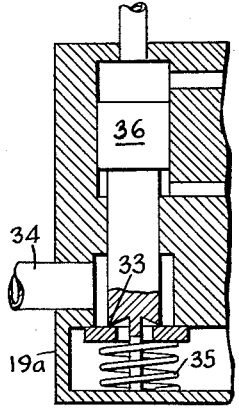
FIG. 3A is an enlarged view of the exhaust valve associated with the upper chamber of the actuator in the system of FIG. 3.
Figure 2:
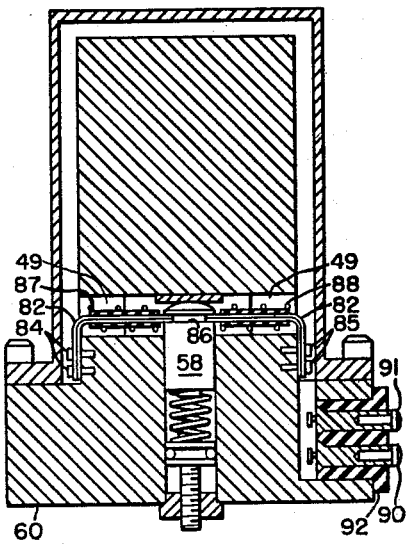
FIG. 2 is a sectional view of the sensing device taken along the line II—II of FIG. 1.
Figure 4:
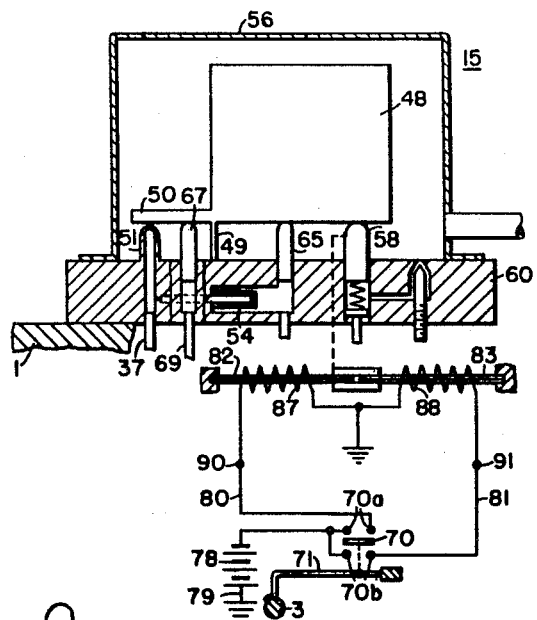
FIG. 4 is a diagrammatic view of a modified sensing and control element.

An alternative method of providing vehicle leveling control to that shown in FIG. 3 is shown in the detailed embodiment of FIGS. 1 and 2 and the diagrammatic illustration of FIG. 4. In this embodiment the piston 58 is provided with a leveling bias structure comprising two bimetallic strips 82 and 83 secured to the base 60 by the screws 84 and 85, respectively, and inserted at their other ends into a slot 86 in the head of the piston 58. The bimetallic strip 82 is provided with a heater winding 87 and the bimetallic strip 83 is provided with a heater winding 88. The heater windings 87 and 88 are connected into a circuit shown in FIG. 4 with the heater element 87, for example, connected to ground and through the terminal 90 to the conductor 80 and the heater element 88 connected to ground and through the terminal 91 to the conductor 81. The parallel connected members of the contacts 70a and 70b are connected through the battery 78 and conductor 79 to ground. With this circuit arrangement, it can be seen that a selected one of the heater elements can be energized through the previously described controller switch 70, while the remaining element remains deenergized.

The bimetallic strips 82 and 83 are secured to the base 60 in such relative positions that when heated, the strip 82 bows upwardly and the strip 83 bows downwardly. With the two members simultaneously and constantly in engagement with the piston 58, it can be seen that a change in ambient temperature would result in opposing forces being applied to the piston 58 with no change in the position of the piston 58. A heating of one bimetallic strip with respect to the other would, however, result in a raising or lowering of the piston 58.

The specific thermal or bimetallic means for leveling in response to changes in load is claimed in the Lawrence B. Lynn et al. Patent No. 2,860,889.

In the views of FIGS. 1 and 2, support leaf springs 49 are secured to the weight 48 at a point above the lower surface of the weight. This difference in support over that shown in FIG. 4, where the pivot point occurs below the weight 48, has been found to be desirable in some cases for the purpose of changing the ratio of vertical to lateral acceleration response. Although the pivot point is shown to be approximately even with the lower surface of the sensing weight 48 in FIGS. 1 and 2 and shown to be below the sensing weight 48 in FIG. 4, it is obvious that this pivot point could also be well above the lower surface of the weight 48, the essential requirement being that the effective pivot point be displaced vertically above or below the center of gravity of the mass to give response to lateral accelerations and horizontally to either side of the center of gravity of the mass to give response to vertical accelerations. Otherwise the position of the pivot point is a matter of choice of design necessary for obtaining the proper response ratio.

The view of FIG. 1 also differs from the showing of FIG. 4 by including a sensing weight travel limiter 89 for preventing over-movement of the sensing weight 48. In FIG. 2, there is also shown a pair of terminals 90 and 91 secured within an insulating block 92 supported on the base 60 of the sensing device 15. The terminals 90 and 91 are used to connect the heater elements 87 and 88 to the conductors 80 and 81 respectively, for leveling control. As shown in FIG. 4, the common terminal of the heater elements 87 and 88 is connected to ground with the ground acting as the conductor 79 of FIG. 4. Ground in this case would normally be the chassis or vehicle frame mass 1.

Since changes may be made in the above described construction and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. Sensing and control means for a body whose movements are to be controlled, comprising in combination a base attachable to said body, connections incorporated in said sensing and control means to which a hydraulic power source may be applied, an elastic pivot attached to said base, a control mass supported by said pivot and pivoted at an axis distant from its center of gravity, whereby movements of said base will cause angular excursions of said control mass about said pivot axis, valve means for controlling said power source actuated by the excursions of said control mass, hydraulic connections for an actuator to be powered under the control of said valve means, and feedback means cooperating with said control mass, said feedback means also having hydraulic connections attachable to the said mentioned actuator.

2. Sensing and control means for a body whose movements are to be controlled, comprising in combination a base attachable to said body, connections incorporated in said sensing and control means to which a hydraulic power source may be applied, an elastic pivot attached to said base, a control mass supported by said pivot and pivoted at an axis distant from its center of gravity, whereby movements of said base will cause angular excursions of said control mass about said pivot axis, dash pot means for damping said angular excursions, valve means for controlling said power source actuated by the excursions of said control mass, hydraulic connections for an actuator to be powered under the control of said valve means, and feedback means cooperating with said control mass, said feedback means also having hydraulic connections attachable to the said mentioned actuator.

3. Sensing and control means for a body whose movements are to be controlled, comprising in combination a base attachable to said body, connections incorporated in said sensing and control means to which a hydraulic power source may be applied, a control mass pivoted about an axis distant from its center of gravity and supported elastically, whereby movements of said base will cause angular excursions of said control mass about said pivot axis, adjustable damping means for selectively damping said angular excursions, valve means for controlling said power source actuated by the excursions of said control mass, hydraulic connections for an actuator to be powered under the control of said valve means, feedback means cooperating with said control mass, said feedback means also having hydraulic connections attachable to said mentioned actuator, and compensating means for movements of said control mass caused by reason of variations in pressure of said hydraulic power source.

4. Sensing means for sensing movements of a body in space, in combination, a base the movements of which in space are to be sensed, an elastic pivot attached to said base, a mass supported by said pivot for pivoting about an axis fixed with reference to the base, said mass being so pivoted that its center of gravity falls to one side of the pivot axis, an arm projecting rigidly from the mass in a direction away from the center of gravity and beyond the said pivot axis, resilient biasing means for resiliently holding the mass in a given position with reference to said base, whereby any movement of the base to cause the said axis to move transverse of itself will cause said mass, and thus the projecting arm, to move from said given position with respect to the base, and fluid pressure means responsive to movement of the arm projecting from the mass to produce a change in fluid pressure in said fluid pressure means as a function of the movement of the arm with reference to the base.

5. Sensing means for sensing movements of a body in space, in combination, a base the movements of which in space are to be sensed, an elastic pivot attached to said base, a mass supported by said pivot for pivoting about an axis fixed with reference to the base, said mass being so pivoted that its center of gravity falls to one side of the pivot axis, an arm projecting rigidly from the mass in a direction away from the center of gravity and beyond the said pivot axis, resilient biasing means for resiliently holding the mass in a given position with reference to said base, damping means, coacting with said biasing means, for damping vibratory movements of said mass about its pivot axis, whereby any movement of the base to cause the said axis to move transverse of itself will cause said mass, and thus the projecting arm, to move from said given position with respect to the base, and fluid pressure means responsive to movement of the arm projecting from the mass to produce a change in fluid pressure in said fluid pressure means as a function of the movement of the arm with reference to the base.

6. Sensing means for sensing movements of a body in space, in combination, a base the movements of which in space are to be sensed, a mass pivoted about an axis fixed with reference to the base, said mass being so pivoted that its center of gravity falls to one side of the pivot axis, an arm projecting rigidly from the mass in a direction away from the center of gravity and beyond the said pivot axis, adjustable resilient biasing means resiliently holding the mass in a given position with reference to the base, whereby any movement of the base to cause said pivot axis to move transverse of itself will cause said mass, and thus the projecting arm, to move from said given position with respect to the base, fluid pressure means including a nozzle disposed in cooperative relation to the arm at a selected distance from said pivot axis to thus be responsive to movement of the arm projecting from the mass to produce a change in fluid pressure in said fluid pressure means, from the normal fluid pressure in said fluid pressure means, as a function of the movement of the arm with reference to the base, and means responsive to the normal fluid pressure in said fluid pressure means and acting on said mass on the side of the pivot axis opposite to the position of said nozzle to compensate for variations of the normal pressure in said fluid pressure means.

7. Sensing means for sensing movements of a body in space, in combination, a base the movements of which in space are to be sensed, a mass pivoted about an axis fixed with reference to the base, said mass being so pivoted that its center of gravity falls to one side of the pivot axis, an arm projecting rigidly from the mass in a direction away from the center of gravity and beyond the said pivot axis, adjustable resilient biasing means resiliently holding the mass in a given position with reference to the base, adjustable damping means, coacting with said biasing means, for damping vibratory movements of said mass about its pivot axis, whereby any movement of the base to cause said pivot axis to move transverse of itself will cause said mass, and thus the projecting arm, to move from said given position with respect to the base, fluid pressure means including a nozzle disposed in cooperative relation to the arm at a selected distance from said pivot axis to thus be responsive to movement of the arm projecting from the mass to produce a change in fluid pressure in said fluid pressure means, from the normal fluid pressure in said fluid pressure means, as a function of the movement of the arm with reference to the base, and means responsive to the normal fluid pressure in said fluid pressure means and acting on said mass on the side of the pivot axis opposite to the position of said nozzle to compensate for variations of the normal pressure in said fluid pressure means.

8. Sensing means for sensing movements of a body in space, in combination, a base the movements of which in space are to be sensed, a mass pivoted about an axis fixed with reference to the base, said mass being so pivoted that its center of gravity falls to one side of the pivot axis, an arm projecting rigidly from the mass in a direction away from the center of gravity and beyond the said pivot axis, adjustable resilient biasing means resiliently holding the mass in a given position with reference to the base, whereby any movement of the base to cause said pivot axis to move transverse of itself will cause said mass, and thus the projecting arm, to move from said given position with respect to the base, fluid pressure means including a conduit having an orifice disposed a selected distance from said pivot axis in cooperative relation to said arm to thus be responsive to movement of the arm projecting from the mass to produce a change in fluid pressure in said fluid pressure means, from the normal fluid pressure in said fluid pressure means, as a function of the movement of the arm with respect to the base, means responsive to the normal fluid pressure in said fluid pressure means and acting on said mass on the side of the pivot axis opposite to the position of said orifice to compensate for variations of the normal pressure in said fluid pressure means, and means responsive to the velocity of movement of the base for modifying the movement of said mass as a function of the velocity of movement of the base.

9. Sensing means for sensing movements of a body in space, in combination, a base the movements of which in space are to be sensed, a mass pivoted about an axis fixed with reference to the base, said mass being so pivoted that its center of gravity falls to one side of the pivot axis, an arm projecting rigidly from the mass in a direction away from the center of gravity and beyond the said pivot axis, adjustable resilient biasing means resiliently holding the mass in a given position with reference to the base, adjustable damping means, coacting with said biasing means, for damping vibratory movements of said mass about its pivot axis, whereby any movement of the base to cause said pivot axis to move transverse of itself will cause said mass, and thus the projecting arm, to move from said given position with respect to the base, fluid pressure means including a conduit having an orifice disposed a selected distance from said pivot axis in cooperative relation to said arm to thus be responsive to movement of the arm projecting from the mass to produce a change in fluid pressure in said fluid pressure means, from the normal fluid pressure in said fluid pressure means, as a function of the movement of the arm with respect to the base, means responsive to the normal fluid pressure in said fluid pressure means and acting on said mass on the side of the pivot axis opposite to the position of said orifice to compensate for variations of the normal pressure in said fluid pressure means, and means responsive to the velocity of movement of the base for modifying the movement of said mass as a function of the velocity of movement of the base.

References Cited in the file of this patent
UNITED STATES PATENTS
2,492,990     Hanna _____ Jan. 3, 1950